United States Patent
Nishita et al.

(10) Patent No.: US 11,731,880 B2
(45) Date of Patent: Aug. 22, 2023

(54) CARBONACEOUS MATERIAL AND METHOD FOR PRODUCING SAME, ELECTRODE ACTIVE MATERIAL FOR ELECTROCHEMICAL DEVICES, ELECTRODE FOR ELECTROCHEMICAL DEVICES, AND ELECTROCHEMICAL DEVICE

(71) Applicant: KURARAY CO., LTD., Kurashiki (JP)

(72) Inventors: Yumika Nishita, Bizen (JP); Hiroyuki Nishinami, Bizen (JP); Shushi Nishimura, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 385 days.

(21) Appl. No.: 17/260,601

(22) PCT Filed: Jul. 17, 2019

(86) PCT No.: PCT/JP2019/028094
§ 371 (c)(1),
(2) Date: Jan. 15, 2021

(87) PCT Pub. No.: WO2020/017553
PCT Pub. Date: Jan. 23, 2020

(65) Prior Publication Data
US 2021/0269315 A1    Sep. 2, 2021

(30) Foreign Application Priority Data

Jul. 20, 2018 (JP) ................................. 2018-137129

(51) Int. Cl.
*C01B 32/30* (2017.01)
*C01B 32/336* (2017.01)
(Continued)

(52) U.S. Cl.
CPC .......... *C01B 32/336* (2017.08); *C01B 32/318* (2017.08); *C01B 32/384* (2017.08);
(Continued)

(58) Field of Classification Search
CPC ..... C01B 32/30; C01B 32/312; C01B 32/318; C01B 32/336; B01J 20/20; B01J 20/28066; B01J 20/28073; B01J 20/2808
See application file for complete search history.

(56) References Cited

U.S. PATENT DOCUMENTS 6,309,446 B1 * 10/2001 Nakanoya ................ B01J 20/20
                                                          502/430
8,926,932 B2    1/2015 Pfeifer et al.
(Continued)

FOREIGN PATENT DOCUMENTS

EP    1 211 702 A1    6/2002
JP       3038676 B2    3/2000
(Continued)

OTHER PUBLICATIONS

Extended European Search Report dated Mar. 21, 2022 in European Patent Application No. 19838433.1, citing documents AA and AO therein, 7 pages.
(Continued)

*Primary Examiner* — Hoa (Holly) Le
(74) *Attorney, Agent, or Firm* — Oblon, McClelland, Maier & Neustadt, L.L.P.

(57) ABSTRACT

A carbonaceous material may have a high capacitance per volume as well as a high durability, and/or may have a BET specific surface area is 1,500 to 1,900 m²/g, an average pore size is 1.84 to 2.05 nm at a nitrogen relative pressure $P/P_0$ of 0.93 in a nitrogen adsorption isotherm measured at 77.4 K, a ratio of pore volume having a pore size of 3 nm or smaller, determined by the BJH method, is 65 to 90%
(Continued)

relative to total pore volume calculated based on a nitrogen adsorption amount at a relative pressure $P/P_0$ of 0.93 in the nitrogen adsorption isotherm, and a ratio of pore volume having a pore size of 1 to 2 nm, determined by the MP method, is 10 to 20% relative to total pore volume calculated based on the nitrogen adsorption amount at a relative pressure $P/P_0$ of 0.93 in the nitrogen adsorption isotherm.

11 Claims, 5 Drawing Sheets

(51) Int. Cl.
    *C01B 32/318*     (2017.01)
    *C01B 32/384*     (2017.01)
    *H01G 11/24*     (2013.01)
    *H01G 11/34*     (2013.01)

(52) U.S. Cl.
    CPC .............. *H01G 11/24* (2013.01); *H01G 11/34* (2013.01); *C01P 2006/11* (2013.01); *C01P 2006/12* (2013.01); *C01P 2006/14* (2013.01); *C01P 2006/16* (2013.01); *C01P 2006/37* (2013.01); *C01P 2006/40* (2013.01)

(56) References Cited

U.S. PATENT DOCUMENTS

| | | | |
|---|---|---|---|
| 2015/0283534 A1* | 10/2015 | Costantino | C01B 32/30 585/16 |
| 2016/0028135 A1 | 1/2016 | Iida et al. | |
| 2016/9012980 | 1/2016 | Fujii et al. | |
| 2019/0022624 A1 | 1/2019 | Yamanoi et al. | |
| 2019/0341202 A1 | 11/2019 | Nishita et al. | |

FOREIGN PATENT DOCUMENTS

| | | |
|---|---|---|
| JP | 2000-182904 A | 6/2000 |
| JP | 2007-281346 A | 10/2007 |
| JP | 2010-105836 A | 5/2010 |
| JP | 2011-20907 A | 2/2011 |
| JP | 5202460 B2 | 6/2013 |
| JP | 2017-171538 A | 9/2017 |
| WO | WO 2014/136936 A1 | 9/2014 |
| WO | WO 2014/167981 A1 | 10/2014 |
| WO | WO 2017/146044 A1 | 8/2017 |
| WO | WO 2017/170754 A1 | 10/2017 |
| WO | WO 2018/092721 A1 | 5/2018 |

OTHER PUBLICATIONS

International Preliminary Report on Patentability and Written Opinion dated Jan. 26, 2021 in PCT/JP2019/028094 (submitting English translation only), citing document AJ therein, 5 pages.
International Search Report dated Oct. 21, 2019 in PCT/JP2019/028094 (submitting English translation only), citing documents AJ-AR therein, 2 pages.
Extended European Search Report dated Mar. 21, 2022 in European Patent Application No. 19838433.1, 7 pages.

\* cited by examiner

CARBONACEOUS MATERIAL AND METHOD FOR PRODUCING SAME, ELECTRODE ACTIVE MATERIAL FOR ELECTROCHEMICAL DEVICES, ELECTRODE FOR ELECTROCHEMICAL DEVICES, AND ELECTROCHEMICAL DEVICE

TECHNICAL FIELD

The present invention relates to a carbonaceous material, a method of producing the same, an electrode active material for electrochemical devices, an electrode for electrochemical devices, and an electrochemical device.

BACKGROUND ART

Electric double-layer capacitors, which are one type of electrochemical devices, utilize the capacity (electric double-layer capacitance) obtained solely from physical adsorption and desorption of ions without involving any chemical reaction and, therefore, have excellent output characteristics and life characteristics as compared to batteries. In addition, lithium ion capacitors, which are another type of electrochemical devices, have been attracting attention as hybrid capacitors that can further improve the energy density of electric double-layer capacitors. In recent years, these electrochemical devices have been attracting attention because of their excellent characteristics and prompt measures for environmental problems in the field of regenerative energy storage applications where, for example, they are mounted on automobiles. However, the performance requirements for such electrochemical devices to be mounted on vehicles are becoming increasingly stringent, and the electrochemical devices are demanded to have a high capacity and a high durability under more severe service conditions (e.g., temperature environment) than the conditions of consumer use.

In response to such demands, a variety of electric double-layer capacitors in which the pore distribution, the specific surface area and the like of activated carbon are controlled have been reported. For example, Patent Document 1 discloses an electric double-layer capacitor that employs an electrode composed of an activated carbon having particular specific surface area, average pore size and total pore volume as well as a relatively high volume ratio of mesopores of 20 Å or larger in pore size.

Patent Document 2 discloses an electrode for electric double-layer capacitors, in which an activated carbon having particular BET specific surface area and pore volume as well as a relatively large average pore size is used.

Patent Document 3 discloses an electric double-layer capacitor in which an activated carbon having particular BET specific surface area, powder packing density and average particle size is used.

PRIOR ART DOCUMENTS

Patent Documents

[Patent Document 1] Japanese Patent No. 3038676
[Patent Document 2] Japanese Laid-Open Patent Publication No. 2017-171538
[Patent Document 3] Japanese Laid-Open Patent Publication No. 2000-182904

SUMMARY OF THE INVENTION

Problems to be Solved by the Invention

According to the studies conducted by the present inventors on the activated carbons described in Patent Documents 1 to 3, it was found that a further improvement is necessary in order to obtain an electrode having a high capacitance per volume and excellent durability. For example, in the case of such an activated carbon having a high pore volume ratio of mesopores as disclosed in Patent Document 1, it was found that an excessively large amount of mesopores may cause a reduction in the bulk density of the electrode and a reduction in the capacitance per volume. Further, in the case of such an activated carbon having a relatively large pore size as disclosed in Patent Document 2, it was found that the large pore size may cause a reduction in the bulk density of the electrode and a reduction in the initial capacitance per volume. In the case of the activated carbon disclosed in Patent Document 3, it was found that an excessively high pore volume ratio of micropores can potentially cause a reduction in the durability and an increase in the internal resistance.

In view of the above, an object of the present invention is to provide: a carbonaceous material which has a high capacitance per volume as well as a high durability; and a method of producing the same.

Means for Solving Problems

In order to solve the above-described problems, the present inventors conducted detailed studies on carbonaceous materials and their production methods. As a result, the present inventors discovered that the above-described problems are solved by the following carbonaceous material, thereby completing the present invention:

a carbonaceous material, wherein
a BET specific surface area is 1,500 to 1,900 $m^2/g$,
an average pore size is 1.84 to 2.05 nm at a nitrogen relative pressure $P/P_0$ of 0.93 in a nitrogen adsorption isotherm measured at a temperature of 77.4 K,
a ratio of a volume of pores having a pore size of 3 nm or smaller, which volume is determined by the BJH method, is 65 to 90% with respect to a total pore volume calculated based on a nitrogen adsorption amount at a relative pressure $P/P_0$ of 0.93 in the nitrogen adsorption isotherm, and
a ratio of a volume of pores having a pore size of 1 to 2 nm, which volume is determined by the MP method, is 10 to 20% with respect to the total pore volume calculated based on the nitrogen adsorption amount at a relative pressure $P/P_0$ of 0.93 in the nitrogen adsorption isotherm.

That is, the present invention encompasses the following preferred modes.

[1] A carbonaceous material, wherein
a BET specific surface area is 1,500 to 1,900 $m^2/g$,
an average pore size is 1.84 to 2.05 nm at a nitrogen relative pressure $P/P_0$ of 0.93 in a nitrogen adsorption isotherm measured at a temperature of 77.4 K,
a ratio of a volume of pores having a pore size of 3 nm or smaller, which volume is determined by the BJH method, is 65 to 90% with respect to a total pore volume calculated based on a nitrogen adsorption amount at a relative pressure $P/P_0$ of 0.93 in the nitrogen adsorption isotherm, and
a ratio of a volume of pores having a pore size of 1 to 2 nm, which volume is determined by the MP method, is 10 to 20% with respect to the total pore volume calculated based on the nitrogen adsorption amount at a relative pressure $P/P_0$ of 0.93 in the nitrogen adsorption isotherm.

[2] The carbonaceous material according to [1], wherein a ratio of the volume of pores having a pore size of 1 to 2 nm, which volume is determined by the MP method, is 10 to 22% with respect to a total micropore volume determined by the MP method.

[3] The carbonaceous material according to [1] or [2], wherein the total pore volume calculated based on the nitrogen adsorption amount at a relative pressure $P/P_0$ of 0.93 in the nitrogen adsorption isotherm is 0.7 to 1.0 cm$^3$/g.

[4] The carbonaceous material according to any one of [1] to [3], having a powder packing density of 0.60 to 0.73 g/cm$^3$ when compressed with a pressure of 12 kN.

[5] The carbonaceous material according to any one of [1] to [4], which is based on a plant-derived carbon precursor.

[6] The carbonaceous material according to any one of [1] to [5], wherein the plant-derived carbon precursor is derived from a coconut shell.

[7] An electrode active material for electrochemical devices, comprising the carbonaceous material according to any one of [1] to [6].

[8] A method of producing the carbonaceous material according to any one of [1] to [6], wherein
the method comprises performing carbonization, primary activation with an activation gas containing water vapor, washing, and secondary activation with an activation gas containing water vapor on a carbon precursor to obtain the carbonaceous material.

[9] An electrode for electrochemical devices, comprising the electrode active material for electrochemical devices according to [7].

An electrochemical device, comprising the electrode for electrochemical devices according to [9].

Effects of the Invention

The carbonaceous material of the present invention has a micropore distribution suitable for reducing the internal resistance, but does not have an excessive mesopore distribution that causes a reduction in the capacitance per volume. Thus, when the carbonaceous material of the present invention is used as an electrode active material, an increase in the resistance is inhibited and the durability such as capacitance retention rate is improved in an electrochemical device equipped with an electrode containing the electrode active material. In addition, the capacitance per volume of the electrochemical device can be increased.

Generally speaking, in electrochemical devices, the performance after a durability test needs to be ensured. The use of a material that has a high capacity retention rate and exhibits a high capacitance per volume after a durability test allows a superior capacitor cell design in terms of cost and cell performance. Therefore, an electrode containing the carbonaceous material of the present invention (the electrode active material for electrochemical devices according to the present invention) can be suitably utilized as an electrode for electrochemical devices that are demanded to have a high durability, such as electric double-layer capacitors and lithium ion capacitors.

MODE FOR CARRYING OUT THE INVENTION

Figure 1:
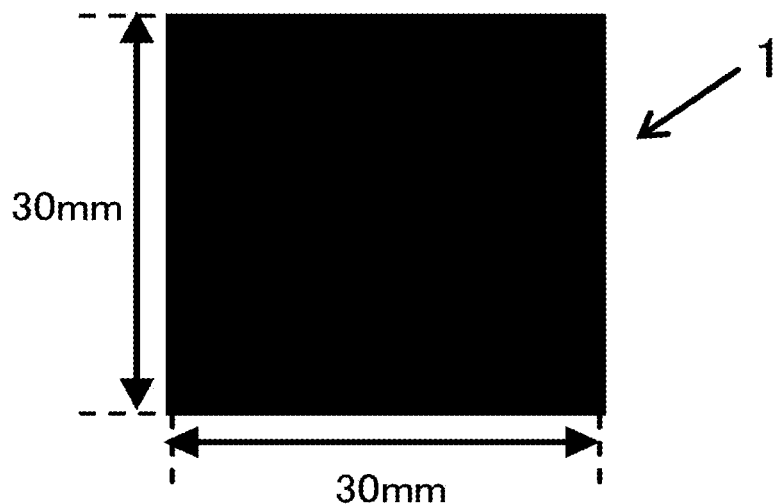
FIG. 1 is a drawing that illustrates a sheet-form electrode composition.

Embodiments of the present invention will now be described in detail. It is noted here, however, that the scope of the present invention is not restricted to the below-described embodiments, and various modifications can be made within a range that does not depart from the gist of the present invention.

In the carbonaceous material of the present invention, a BET specific surface area is 1,500 to 1,900 m$^2$/g; an average pore size is 1.84 to 2.05 nm at a nitrogen relative pressure $P/P_0$ of 0.93 in a nitrogen adsorption isotherm measured at a temperature of 77.4 K; a ratio of a volume of pores having a pore size of 3 nm or smaller, which volume is determined by the BJH method, is 65 to 90% with respect to a total pore volume calculated based on a nitrogen adsorption amount at a relative pressure $P/P_0$ of 0.93 in the nitrogen adsorption isotherm; and a ratio of a volume of pores having a pore size of 1 to 2 nm, which volume is determined by the MP method, is 10 to 20% with respect to the total pore volume calculated based on the nitrogen adsorption amount at a relative pressure $P/P_0$ of 0.93 in the nitrogen adsorption isotherm.

The carbonaceous material of the present invention has a BET specific surface area of 1,500 to 1,900 m$^2$/g. Generally, the capacitance per unit area is constant. Therefore, when the BET specific surface area is smaller than 1,500 m$^2$/g, the capacitance per unit mass is excessively small. Meanwhile, when the BET specific surface area is larger than 1,900 m$^2$/g, the bulk density of an electrode that is produced using such an activated carbon is reduced, resulting in an excessively small capacitance per volume. From the standpoint of improving both the capacitance per unit mass and the capacitance per unit volume, the BET specific surface area is preferably 1,550 to 1,850 m$^2$/g, more preferably 1,600 to 1,800 m²/g. With regard to the durability, since it is largely influenced by the specific surface area as well as the average pore size, the pore distribution and the pore volume, it is necessary to take these properties into consideration in a comprehensive manner.

In the carbonaceous material of the present invention, the average pore size is 1.84 to 2.05 nm at a nitrogen relative pressure $P/P_0$ of 0.93 in a nitrogen adsorption isotherm measured at a temperature of 77.4 K. An average pore size of smaller than 1.84 nm is not desirable since it leads to an increase in the internal resistance and a reduction in the durability due to an increase in the ion transfer resistance in the pores. Further, an average pore size of larger than 2.05 nm is also not desirable since it leads to a reduction in the electrode density. From the standpoint of maintaining a high durability and increasing the electrode density, the average pore size is preferably smaller than 2.05 nm, more preferably 2.00 nm or smaller. From the same standpoint, the average pore size is preferably 1.85 nm or larger.

The BET specific surface area and the average pore size are determined by a nitrogen adsorption method and can be measured by, for example, the respective methods described below in the section of Examples.

In the carbonaceous material of the present invention, the ratio of the volume of pores having a pore size of 3 nm or smaller, which volume is determined by the BJH method, with respect to a total pore volume calculated based on the nitrogen adsorption amount at a relative pressure $P/P_0$ of 0.93 in a nitrogen adsorption isotherm (this ratio is hereinafter also referred to as "ratio A") is 65 to 90%. The ratio A is calculated by the following formula (a):

$$\text{Ratio } A = \frac{\text{(Volume of pores having a pore size of 3 nm or smaller,} \\ \text{which is determined by BJH method)}}{\begin{pmatrix} \text{Total pore volume calculated based on} \\ \text{nitrogen adsorption amount at relative pressure} \\ P/P_0 \text{ of 0.93 in nitrogen adsorption isotherm} \end{pmatrix}} \times 100 \quad (a)$$

When the ratio A is higher than 90%, the internal resistance of the electrode is increased and this leads to a reduction in the durability, which is not desirable. When the ratio A is lower than 65%, the bulk density is reduced and this leads to a reduction in the capacitance per volume, which is also not desirable. From the standpoint of maintaining a high durability and improving the capacitance, the ratio A is preferably 70 to 85%, more preferably 72 to 83%.

The BJH method, which was proposed by Barrett, Joyner, Halenda, et al., is a calculation method generally used for the analysis of mesopores similarly to the CI method and the DH method. In the present invention, the pore volume can be determined by applying the BJH method to a nitrogen adsorption-desorption isotherm measured by a nitrogen adsorption method. In the present specification, the term "mesopore" refers to a pore having a pore size of 2 nm or larger, and the term "micropore" refers to a pore having a pore size of 2 nm or smaller. Further, the volume of pores having a pore size of 3 nm or smaller, which is determined by the BJH method, is a value calculated by subtracting the volume of pores having a pore size of 3 nm or larger, which is determined by the BJH method, from a total pore volume calculated based on a nitrogen adsorption amount at a relative pressure $P/P_0$ of 0.93 in a nitrogen adsorption isotherm.

In the carbonaceous material of the present invention, the ratio of the volume of micropores having a pore size of 1 to 2 nm, which volume is determined by the MP method, with respect to a total pore volume calculated based on the nitrogen adsorption amount at a relative pressure $P/P_0$ of 0.93 in a nitrogen adsorption isotherm (this ratio is hereinafter also referred to as "ratio B") is 10 to 20%. The ratio B is calculated by the following formula (b):

$$\text{Ratio } B = \frac{\text{(Volume of pores having a pore size of 1 to 2 nm,} \\ \text{which is determined by MP method)}}{\begin{pmatrix} \text{Total pore volume calculated based on} \\ \text{nitrogen adsorption amount at relative pressure} \\ P/P_0 \text{ of 0.93 in nitrogen adsorption isotherm} \end{pmatrix}} \times 100 \quad (b)$$

When the ratio B is lower than 10%, the internal resistance of the electrode is increased and this leads to a reduction in the durability, which is not desirable. When the ratio B is higher than 20%, the bulk density is reduced and this leads to a reduction in the capacitance per volume, which is also not desirable. From the standpoint of improving the durability, the ratio B is preferably 11% or higher, more preferably 12% or higher, still more preferably 12.3% or higher. From the standpoint of maintaining a high durability and improving the capacitance, the ratio B is preferably 11 to 18%, more preferably 12 to 15%. Pores having a pore size of 1 to 2 nm are pores having a larger pore size among micropores. In a carbonaceous material having a specific average pore size of 1.84 to 2.05 nm as defined in the present invention, small micropores of 1 nm or smaller in size can relatively easily exist; however, it is difficult to allow a large number of relatively large micropores of 1 to 2 nm in size to exist while maintaining the above-described average pore size. For example, when it is tried to allow relatively large micropores of 1 to 2 nm in size to exist in a large number, the number of mesopores having a pore size of 3 nm or larger is likely to be increased as well, and the average pore size is likely to exceed the upper limit of the above-described range as a result. Therefore, the characteristic features of the carbonaceous material of the present invention to have a specific average pore size and a ratio B of 10 to 20% indicate that a greater number of pores having a pore size of 1 to 2 nm exist in the carbonaceous material of the present invention than in an ordinary carbonaceous material having an average pore size in substantially the same range. It is believed that the carbonaceous material of the present invention achieves the effects of improving the capacitance per volume and enhancing the durability by having a specific average pore size and an increased ratio of specific pores having a pore size of 1 to 2 nm.

In the carbonaceous material of the present invention, the ratio of the volume of pores having a pore size of 1 to 2 nm, which volume is determined by the MP method, with respect to a total micropore volume determined by the MP method (this ratio is hereinafter also referred to as "ratio C") is preferably 10 to 22%, more preferably 11 to 21%, still more preferably 11 to 20%. The ratio C is calculated by the following formula (c):

$$\text{Ratio } C = \frac{\text{(Volume of pores having a pore size of 1 to 2 nm,} \\ \text{which is determined by } MP \text{ method)}}{\text{(Total micropore volume determined by } MP \text{ method)}} \times 100 \quad (c)$$

When the ratio C is not lower than the above-described lower limit value, the internal resistance of an electrode is likely to be reduced, and the durability performance is thus likely to be enhanced. Further, when the ratio C is not higher than the above-described upper limit value, the bulk density is likely to be increased, and the capacitance per volume is thus likely to be improved. The feature that the ratio C is in the above-described range indicates that, among all micropores, relatively large micropores of 1 to 2 nm in size exist in a large number. The term "total micropore volume determined by the MP method" used herein refers to the volume of micropores having a pore size of 2 nm or smaller which is determined by the MP method.

The MP method, which was devised by M. Mikhail, Brunauer and Bodor, is a method of determining the micropore volume, the micropore area and the micropore distribution by utilizing a "t-plot" (B. C. Lippens and J. H. de Boer, J. Catalysis, 4319(1965)). In the present invention, the pore volume can be determined by applying the MP method to a nitrogen adsorption isotherm measured by a nitrogen adsorption method.

In the carbonaceous material of the present invention, the total pore volume, which is calculated based on the nitrogen adsorption amount at a relative pressure $P/P_0$ of 0.93 on a nitrogen adsorption isotherm, is preferably 0.7 to 1.0 cm$^3$/g, more preferably 0.72 to 0.95 cm$^3$/g, still more preferably 0.75 to 0.90 cm$^3$/g. The total pore volume is desirably in this range since a good balance between the capacitance and the resistance is thereby attained. The total pore volume can be calculated based on the nitrogen adsorption amount at a relative pressure $P/P_0$ of 0.93 on a nitrogen adsorption isotherm measured by a nitrogen adsorption method.

The powder packing density of the carbonaceous material of the present invention when compressed with a pressure of 12 kN is preferably 0.60 to 0.73 g/cm$^3$, more preferably 0.62 to 0.72 g/cm$^3$, still more preferably 0.63 to 0.71 g/cm$^3$. When the powder packing density is not lower than the above-described lower limit value, the electrode density is likely to be increased since the spatial volume is reduced, and the initial capacitance is thus likely to be improved. Further, when the powder packing density is not higher than the above-described upper limit value, the internal resistance is likely to be reduced because of the presence of a certain spatial volume, and a reduction in the capacitance caused by a durability test is like to be inhibited, so that the durability is likely to be improved.

The powder packing density can be determined by filling the carbonaceous material into a container and compressing the carbonaceous material with a pressure of 12 kN using a powder resistance measurement unit MCP-PD51 manufactured by Mitsubishi Chemical Analytech Co., Ltd.

The average particle size of the carbonaceous material of the present invention is preferably 30 μm or smaller, more preferably 20 μm or smaller. The average particle size of the carbonaceous material of the present invention is also preferably 2 μm or larger, more preferably 4 μm or larger. When the average particle size is not smaller than the above-described lower limit value, the amount of a binder or the like required for molding an electrode can be reduced, so that a reduction in the capacitance per electrode weight is likely to be inhibited. Further, when the average particle size is not larger than the above-described upper limit value, the resulting electrode layer is likely to be reduced in thickness, so that the resistance tends to be reduced. The average particle size can be determined using, for example, a particle size/particle size distribution analyzer (e.g., "MICROTRAC MT3000" manufactured by Nikkiso Co., Ltd.).

The elemental potassium content in the carbonaceous material of the present invention is preferably 500 ppm or less, more preferably 150 ppm or less, still more preferably 120 ppm or less. When the elemental potassium content is not higher than this upper limit value, problems such as short-circuiting are unlikely to occur in an electrochemical device containing the carbonaceous material. The elemental potassium content in the carbonaceous material is preferably as low as possible, and the lower limit value thereof is 0 ppm or higher, for example, 6 ppm or higher. The elemental potassium content can be measured by, for example, a fluorescent X-ray analysis.

A carbon precursor used as a raw material of the carbonaceous material of the present invention is not particularly restricted as long as it forms an activated carbon when activated, and the carbon precursor can be widely selected from plant-derived carbon precursors, mineral-derived carbon precursors, natural material-derived carbon precursors, and synthetic material-derived precursors. From the standpoint of reducing harmful impurities as well as the environmental protection and commercial standpoints, the carbonaceous material of the present invention is preferably based on a plant-derived carbon precursor. In other words, the carbon precursor used as a raw material of the carbonaceous material of the present invention is preferably derived from a plant.

Examples of the mineral-derived carbon precursors include petroleum-based and coal-based pitches and cokes. Examples of the natural material-derived carbon precursors include carbides of natural fibers made of cotton, hemp or the like, regenerated fibers made of rayon, viscose rayon or the like, and semi-synthetic fibers made of acetate, triacetate or the like. Examples of the synthetic material-derived carbon precursors include carbides of polyamide-based resins such as nylon, polyvinyl alcohol-based resins such as vinylon, polyacrylonitrile-based resins such as acryl, polyolefin-based resins such as polyethylene and polypropylene, polyurethanes, phenolic resins, and vinyl chloride-based resins.

The plant-derived carbon precursor is not particularly restricted, and examples thereof include coconut shells, coffee beans, tea leaves, sugarcane, fruits (e.g., mandarin oranges and bananas), straws, rice husks, broad-leaved trees, coniferous trees, and bamboos. These exemplified materials also include wastes generated after the use of the respective materials for their original purposes (e.g., used tea leaves), and portions of plant materials (e.g., banana peels and mandarin orange peels). These plant materials may be used singly, or in combination of two or more kinds thereof. Among these plant materials, a coconut shell is preferred since it is readily available and can yield a carbonaceous material having various properties. Accordingly, the carbonaceous material of the present invention is preferably based on a plant-derived carbon precursor, more preferably based on a coconut shell-derived carbon precursor.

The coconut shell is not particularly restricted, and examples thereof include coconut shells of palm (oil palm), coconut palm, Salak, double coconut, and the like. These coconut shells may be used singly, or in combination of two or more kinds thereof. Coconut shells of coconut palm and oil palm, which are biomass wastes generated in large amounts after the utilization of coconuts as food, detergent raw materials, biodiesel oil raw materials or the like, are particularly preferred from the standpoint of their availability.

The carbonaceous material of the present invention, particularly an activated carbon, can be produced by a method that comprises obtaining a carbonaceous material through carbonization, primary activation, washing, and secondary activation of the above-described carbon precursor. The present invention also provides a method of producing a carbonaceous material, which method comprises performing carbonization, primary activation with an activation gas containing water vapor, washing, and secondary activation with an activation gas containing water vapor on a carbon precursor to obtain the carbonaceous material.

A system used for the carbonization and the activation is not particularly restricted and, for example, a known system such as a fixed bed system, a moving bed system, a fluidized bed system, a multiple bed system, or a rotary kiln can be employed.

In the method of producing a carbonaceous material according to the present invention, first, a carbon precursor is carbonized. A carbonization method is not particularly restricted, and examples thereof include a method of calcinating the carbon precursor at a temperature of about 400 to 800° C. under an atmosphere of an inert gas, such as nitrogen, carbon dioxide, helium, argon, carbon monoxide or a fuel combustion gas, a mixed gas of these inert gases, or a mixed gas of an inert gas and other gas containing any of the above-described inert gases as a main component.

After the carbonization of the carbon precursor, primary activation is performed. As an activation method, a gas activation method or a chemical activation method can be employed; however, in the present invention, a gas activation method is preferred from the standpoint of reducing the amount of residual impurities. The gas activation method can be performed by allowing the carbonized carbon precursor to react with an activation gas (e.g., water vapor and/or carbon dioxide).

In the primary activation, from the standpoint of allowing the activation to efficiently proceed, it is preferred to use a mixture of water vapor and the same inert gas as the one used in the carbonization, and the partial pressure of water vapor in this process is preferably in a range of 10 to 60%. When the partial pressure of water vapor is 10% or higher, the activation is likely to proceed sufficiently, whereas when the partial pressure of water vapor is 60% or lower, a rapid activation reaction is inhibited and this makes it easier to control the reaction.

The total amount of the activation gas to be supplied in the primary activation is preferably 50 to 10,000 parts by mass, more preferably 100 to 5,000 parts by mass, still more preferably 200 to 3,000 parts by mass, with respect to 100 parts by mass of the carbon precursor. When the total amount of the supplied activation gas is in this range, the activation reaction can proceed more efficiently.

The activation temperature in the primary activation is usually 700 to 1,100° C., preferably 800 to 1,000° C. The activation time and the heating rate are not particularly restricted and are variable depending on the type, shape, size, desired pore size distribution and the like of the carbon precursor to be selected. An increase in the activation temperature or an extension of the activation time in the primary activation tends to increase the BET specific surface area of the resulting carbonaceous material. Therefore, in order to obtain a carbonaceous material having a BET specific surface area in the desired range, the activation temperature and/or the activation time may be adjusted.

The primary activation is preferably performed until the BET specific surface area of the carbonaceous material obtained thereafter reaches about 1,000 to 1,400 $m^2/g$. When the BET specific surface area is 1,000 $m^2$ or larger, pores from which impurities contained therein are efficiently removable can be formed in the subsequent washing process. When the BET specific surface area is 1,400 $m^2$ or larger, a small variation width associated with activation makes it difficult to form pores of desired size and pore distribution, although this depends on the BET specific surface area of the carbonaceous material obtained after the secondary activation.

Next, the carbonaceous material obtained after the primary activation is washed. The washing can be performed by immersing the carbonaceous material obtained after the primary activation in an acid-containing washing liquid. The washing liquid may be, for example, a mineral acid or an organic acid. Examples of the mineral acid include hydrochloric acid and sulfuric acid. Examples of the organic acid include: saturated carboxylic acids, such as formic acid, acetic acid, propionic acid, oxalic acid, tartaric acid, and citric acid; and aromatic carboxylic acids, such as benzoic acid and terephthalic acid. From the standpoint of washing properties, the acid used in the washing liquid is preferably a mineral acid, more preferably hydrochloric acid. After being washed with an acid, the carbonaceous material is preferably further washed with water or the like to remove excess acid. By this operation, the load applied to the activation equipment in the secondary activation can be reduced.

The washing liquid can be usually prepared by mixing an acid and an aqueous solution. Examples of the aqueous solution include water and a mixture of water and a water-soluble organic solvent. Examples of the water-soluble organic solvent include alcohols, such as methanol, ethanol, propylene glycol, and ethylene glycol.

The concentration of the acid in the washing liquid is not particularly restricted and may be adjusted as appropriate in accordance with the type of the acid to be used. The acid concentration of the washing liquid is preferably 0.01 to 3.5% by mass, more preferably 0.02 to 2.2% by mass, still more preferably 0.03 to 1.6% by mass, based on the total amount of the washing liquid. The acid concentration of the washing liquid is preferably in the above-described range since this enables to efficiently remove impurities contained in the carbonaceous material.

The pH of the washing liquid is not particularly restricted and may be adjusted as appropriate in accordance with, for example, the type of the acid to be used and the subject to be removed.

The temperature of the washing liquid into which the carbonaceous material is immersed is not particularly restricted; however, it is preferably 0 to 98° C., more preferably 10 to 95° C., still more preferably 15 to 90° C. The temperature of the washing liquid into which the carbonaceous material is immersed is desirably in the above-described range since this enables to perform the washing in such a manner that the practical time and the load on the equipment are reduced.

A method of washing the carbonaceous material is not particularly restricted as long as the carbonaceous material can be immersed in the washing liquid, and the method may be one in which the washing liquid is continuously added and retained for a prescribed time and immersion is performed while extracting the washing liquid, or one in which the carbonaceous material is immersed and retained in the washing liquid for a prescribed time and, after removing the washing liquid, fresh washing liquid is added and this immersion-liquid removal operation is repeated. Further, the method may be one in which the whole washing liquid is renewed, or one in which the washing liquid is partially renewed. The duration of immersing the carbonaceous material in the washing liquid can be adjusted as appropriate in accordance with the acid to be used, the concentration of the acid, the treatment temperature and the like.

The duration of the washing is not particularly restricted; however, from the standpoints of the economic efficiency of the reaction equipment and the structure retainability of the carbonaceous material, it is preferably 0.05 to 4 hours, more preferably 0.1 to 3 hours.

When the carbonaceous material is immersed in the washing liquid, the mass ratio of the washing liquid and the carbonaceous material may be adjusted as appropriate in accordance with the type, concentration, temperature and the like of the washing liquid to be used. The mass of the carbonaceous material to be immersed is usually 0.1 to 50% by mass, preferably 1 to 20% by mass, more preferably 1.5 to 10% by mass, with respect to the mass of the washing liquid. When the mass of the carbonaceous material is in this range, not only impurities eluted into the washing liquid are unlikely to precipitate out of the washing liquid and re-adhesion of the impurities to the carbonaceous material is thus likely to be inhibited, but also an appropriate volume efficiency is attained; therefore, such an amount of the carbonaceous material is desirable from the standpoint of economic efficiency.

The atmosphere in which the washing is performed is not particularly restricted and may be selected as appropriate in accordance with the method employed for the washing. In the present invention, the washing is usually performed in the air atmosphere.

The washing may be performed once or plural times using a single kind of washing liquid, or may be performed plural times using a combination of two or more kinds of washing liquids.

By the washing, impurities contained in the carbonaceous material can be removed. The impurities originate from the carbon precursor used as a raw material of the carbonaceous material, and examples thereof include: alkali metals, such as lithium, sodium, and potassium; alkaline earth metals, such as beryllium, magnesium, and calcium; and transition metals, such as iron, copper, and nickel.

In the present invention, the elemental potassium content in the carbonaceous material after the washing is preferably 500 ppm or less, more preferably 150 ppm or less, still more preferably 120 ppm or less. In the present invention, when a carbonaceous material based on a plant-derived carbon precursor is used, elemental potassium can be a main component as an impurity. In this case, therefore, it is believed that, with the elemental potassium content being reduced in the carbonaceous material after the washing, the content of other impurities are reduced as well. It is noted here that the elemental potassium content in the carbonaceous material after the washing is preferably as low as possible, and the lower limit value thereof is 0 ppm or higher, for example, 6 ppm or higher.

When impurities such as alkali metals and alkaline earth metals are contained in the carbonaceous material at the time of activation, the number of pores having a large pore size tends to be increased. In addition, the capacitor performance may be adversely affected by residual impurities such as alkali metals and alkaline earth metals. In the production method of the present invention, these impurities are once removed after the primary activation and the secondary activation is further performed thereafter, whereby the number of mesopores that are likely to cause a reduction in the capacitance per volume can be prevented from being excessively large. Further, according to the production method of the present invention, among micropores having a pore size of 2 nm or smaller, the ratio of those pores having a relatively large pore size of 1 to 2 nm can be increased. Therefore, a carbonaceous material that has a high capacitance per volume and yields an electrochemical device having excellent durability can be provided.

In the present invention, the secondary activation is performed on the carbonaceous material obtained after the washing. The secondary activation can be performed under the same conditions as those of the primary activation. In the secondary activation as well, an increase in the activation temperature or an extension of the activation time tends to increase the BET specific surface area of the resulting carbonaceous material. Therefore, in order to obtain a carbonaceous material having a BET specific surface area in the desired range, the activation temperature and/or the activation time may be adjusted.

The carbonaceous material obtained by the secondary activation is preferably further washed to remove ash and metal impurities that are contained in the carbonaceous material after the secondary activation. In addition, the carbonaceous material obtained after the secondary activation may be heat-treated at 500 to 1,500° C. under an inert gas atmosphere or a vacuum atmosphere to thermally remove residues after the washing and to remove unwanted surface functional groups, whereby carbon crystallization may be further enhanced to increase the electroconductivity.

In the present invention, the carbonaceous material obtained in the above-described manner is subsequently pulverized. A pulverization method is not particularly restricted, and any known pulverization method using a ball mill, a roll mill, a jet mill or the like, or a combination of such methods can be employed. The average particle size of the carbonaceous material after the pulverization is not particularly restricted; however, from the standpoint of improving the electrode density and reducing the internal resistance, it is preferably 30 μm or smaller, more preferably 20 μm or smaller, but preferably 2 μm or larger, more preferably 4 μm or larger.

In the present invention, the thus pulverized carbonaceous material may be classified as well. For example, by removing particles having a particle size of 1 μm or smaller, activated carbon particles having a narrow particle size distribution width can be obtained. By the removal of such fine particles, the amount of a binder to be used in the electrode formation can be reduced. A classification method is not particularly restricted, and examples thereof include classification using a sieve, wet classification, and dry classification. Examples of a wet classifier include classifiers utilizing the principle of gravitational classification, inertial classification, hydraulic classification, centrifugal classification or the like. Examples of a dry classifier include classifiers utilizing the principle of sedimentation classification, mechanical classification, centrifugal classification or the like. From the standpoint of economic efficiency, it is preferred to use a dry classifier.

The pulverization and the classification can be performed using a single apparatus. For example, a jet mill equipped with a dry classification function may be used to perform the pulverization and the classification. Alternatively, an apparatus in which a pulverizer and a classifier are independently arranged may be used as well. In this case, the pulverization and the classification can be performed continuously, or they can be performed discontinuously.

Moreover, the thus obtained carbonaceous material may be subjected to a post-treatment, such as a heat treatment or a chemical or physical surface modification, in accordance with the intended use.

The thus obtained carbonaceous material may be dried as well. The drying is an operation performed for removing water and the like adsorbing to the carbonaceous material, and water and the like adsorbing to the carbonaceous material can be removed by, for example, heating the carbonaceous material. In addition to the heating or instead of the heating, the drying can be performed by means of, for example, pressure reduction, reduced-pressure heating or freezing so as to remove water and the like adsorbing to the carbonaceous material.

From the standpoint of removing water adsorbing to the carbonaceous material, the drying temperature is preferably 100 to 330° C., more preferably 110 to 300° C., still more preferably 120 to 250° C.

The drying time varies depending on the drying temperature to be employed; however, from the standpoint of removing water adsorbing to the carbonaceous material, it is preferably 0.1 hours or longer, more preferably 0.5 hours or longer, still more preferably 1 hour or longer. Further, from the standpoint of economic efficiency, the drying time is preferably 24 hours or shorter, more preferably 12 hours or shorter, still more preferably 6 hours or shorter.

The drying can be performed at normal pressure or under a reduced-pressure atmosphere. When the drying is performed at normal pressure, the drying is preferably performed under an atmosphere of an inert gas such as nitrogen gas or argon gas, or under an air atmosphere having a dew point of −20° C. or lower.

The carbonaceous material of the present invention is suitably used as an electrode active material for an electrochemical device. Therefore, the present invention also provides an electrode active material for electrochemical devices which comprises the carbonaceous material of the present invention. In the following descriptions, when the carbonaceous material of the present invention is used as an electrode active material for an electrochemical device, "the carbonaceous material of the present invention" is also an "electrode active material for electrochemical devices which comprises the carbonaceous material of the present invention". Moreover, the present invention provides: an electrode for electrochemical devices, which comprises the electrode active material for electrochemical devices according to the present invention; and an electrochemical device comprising the electrode for electrochemical devices. The electrode for electrochemical devices according to the present invention can be produced by mixing the carbonaceous material of the present invention (electrode active material for electrochemical devices which comprises the carbonaceous material of the present invention) with a binder and, as required, other active material as well as a conductive auxiliary agent, and subsequently molding the resulting mixture.

The carbonaceous material of the present invention has a micropore distribution suitable for reducing the internal resistance, but does not have an excessive mesopore distribution that causes a reduction in the capacitance per volume. Thus, when the carbonaceous material of the present invention is used as an active material in an electrode of an electrochemical device, not only a capacitance per volume (in the use of a carbonaceous material having substantially the same specific surface area) is maintained but also an increase in the resistance is inhibited, so that the durability such as capacity retention rate is enhanced and the voltage resistance is improved. The carbonaceous material of the present invention is useful as an electrode active material for electrochemical devices such as electric double-layer capacitors and lithium ion capacitors, and an electrode containing the carbonaceous material of the present invention (electrode active material for electrochemical devices which comprises the carbonaceous material of the present invention) can be preferably utilized as an electrode for electrochemical devices that are required to have a high durability, such as electric double-layer capacitors and lithium ion capacitors. In such a case, the electrode may also contain a substance that can serve as an electrode active material in addition to the carbonaceous material of the present invention.

EXAMPLES

The present invention will now be described by way of Examples thereof; however, the present invention is not restricted thereto by any means.

First, methods of measuring various physical properties, methods of producing electrodes and electrode cells and a durability test method, which were employed in Examples and Comparative Examples, will be described.

[BET Specific Surface Area]

Using BELSORP-mini manufactured by BEL JAPAN, Inc., a carbonaceous material of interest was heated under a nitrogen stream (nitrogen flow rate: 50 mL/min) at 300° C. for 3 hours, and the nitrogen adsorption isotherm of the carbonaceous material was measured at 77.4 K. The thus obtained nitrogen adsorption isotherm was analyzed by a multi-point BET method, and the specific surface area was calculated from a straight line in a region of relative pressure $P/P_0$=0.01 to 0.1 on the thus obtained curve.

[Total Pore Volume and Average Pore Size]

Using BELSORP-mini manufactured by BEL JAPAN, Inc., a carbonaceous material of interest was heated under a nitrogen stream (nitrogen flow rate: 50 mL/min) at 300° C. for 3 hours, and the nitrogen adsorption isotherm of the carbonaceous material was measured at 77.4 K. The total pore volume was determined from the nitrogen adsorption amount at a relative pressure $P/P_0$ of 0.93 on the thus obtained adsorption isotherm. Further, the average pore size was calculated based on the following formula from the thus determined total pore volume and the above-described BET specific surface area.

Average pore size(nm) =

Total pore volume$(cm^3/g)$/Specific surface area$(m^2/g)$ × 4,000

[Measurement of Mesopore Volume by BJH Method]

Using BELSORP-mini manufactured by BEL JAPAN, Inc., a carbonaceous material of interest was heated under a nitrogen stream (nitrogen flow rate: 50 mL/min) at 300° C. for 3 hours, and the nitrogen adsorption isotherm of the carbonaceous material was measured at 77.4 K. The volume of mesopores was determined by applying the BJH method to the thus obtained nitrogen adsorption isotherm. For the analysis by the BJH method, a standard isotherm for t-method analysis "NGCB-BEL.t" provided by BEL JAPAN, Inc. was used.

First, the volume of pores having a pore size of 3 nm or larger was determined in a range of relative pressure $P/P_0$=0.93 by the BJH method. Next, the volume of pores having a pore size of 3 nm or smaller was calculated by subtracting the above-determined volume of pores having a pore size of 3 nm or larger from the above-determined total pore volume.

[Measurement of Micropore Volume by MP Method]

Using BELSORP-mini manufactured by BEL JAPAN, Inc., a carbonaceous material of interest was heated under a nitrogen stream (nitrogen flow rate: 50 mL/min) at 300° C. for 3 hours, and the nitrogen adsorption isotherm of the carbonaceous material was measured at 77.4 K. The volume of micropores was determined by applying the MP method to the thus obtained nitrogen adsorption isotherm. For the analysis by the MP method, a standard isotherm for t-method analysis "NGCB-BEL.t" provided by BEL JAPAN, Inc. was used.

The volume of pores having a pore size of 1 to 2 nm was calculated by subtracting the volume of pores having a pore size of 1 nm or smaller from the volume of pores having a pore size of 2 nm or smaller which was determined by the MP method. Further, the volume of pores having a pore size of 2 nm or smaller was adopted as the total micropore volume.

[Powder Packing Density]

A carbonaceous material of interest was dried at 120° C. under a reduced-pressure atmosphere (−95 kPa or lower in terms of gauge pressure) for at least 12 hours, and about 0.9 g of the thus dried carbonaceous material was filled into a measuring container (probe cylinder: inner volume=φ20 mm×50 mm), after which the carbonaceous material was compressed to 12 kN using a probe piston, and the thickness of the carbonaceous material was measured. From the weight of the carbonaceous material and the volume of the carbonaceous material under the 12-kN compression, the powder packing density was calculated based on the following formula.

Powder packing density$(g/cm^3)$ = Weight of carbonaceous material (g)/Volume after 12 kN compression$(cm^3)$

[Average Particle Size]

A carbonaceous material of interest was ultrasonically dispersed in ion-exchanged water in the presence of a surfactant, and the particle size distribution was subsequently measured using "MICROTRAC MT3000" manufactured by Nikkiso Co., Ltd. to determine the average particle size.

[Elemental Potassium Content]

The elemental potassium content was measured by the following method. First, a calibration curve was prepared for the elemental potassium content using a standard liquid having a known concentration. Then, a pulverized sample to be measured was dried at 115° C. for 3 hours, and 0.1 g of the thus dried sample was placed in a decomposition vessel, followed by addition of 10 ml of nitric acid thereto and mixing, after which the sample was dissolved using a microwave sample pretreatment apparatus ("MARS6" manufactured by CEM Corporation). The resulting solution was taken out and diluted to 25 ml to prepare a measurement solution, which was subsequently analyzed by an ICP emission spectrometer ("ICPE-9820" manufactured by Shimadzu Corporation). The concentration of elemental potassium was determined from the thus obtained value and the above-prepared calibration curve, and the elemental potassium content (metal content) was calculated using the following formula:

$$\text{Metal content}(ppm) = \frac{\{\text{Metal concentration determined by ICP emission spectral analysis}(mg/L) \times 25 \times 1{,}000\}}{\{\text{Sample weight}(g) \times 1{,}000\}}$$

[Preparation of Test Electrode]

A carbonaceous material (electrode active material for electrochemical devices), a conductive auxiliary agent and a binder, which are members constituting an electrode, were used after at least 16 hours of preliminary vacuum-drying at 120° C. under a reduced-pressure atmosphere (0.1 kPa or lower).

The carbonaceous material, the conductive auxiliary agent and the binder were weighed at a ratio of 81:9:10 [(mass of carbonaceous material):(mass of conductive auxiliary agent):(mass of binder)] and then kneaded. A conductive carbon black "DENKA BLACK Granule" manufactured by Denka Co., Ltd. was used as the conductive auxiliary agent, and a polytetrafluoroethylene "6J" manufactured by Du Pont-Mitsui Fluorochemicals Co., Ltd. was used as the binder. After the kneading, the resultant was cut into flakes of 1 mm square or smaller in size so as to attain further homogenization, and a pressure of 400 kg/cm$^2$ was applied thereto using a coin molding machine, whereby a coin-shaped secondary molded article was obtained. The thus obtained secondary molded article was molded into the form of a sheet having a thickness of 160 μm ±5% (8 μm) using a roll press and subsequently cut out in a prescribed size (30 mm×30 mm) to prepare an electrode composition 1 illustrated in FIG. 1. Then, the thus obtained electrode composition 1 was dried at 120° C. under a reduced-pressure atmosphere for at least 16 hours, and the mass, sheet thickness and dimensions thereof were measured before being used in the below-described measurements.

[Preparation of Electrode Cell to be Measured]

Figure 2:
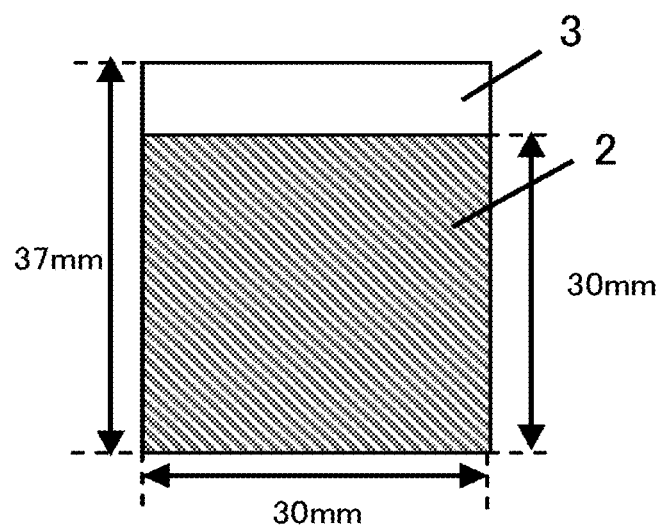
FIG. 2 is a drawing that illustrates a current collector (etching aluminum foil) coated with a conductive adhesive.
Figure 3:
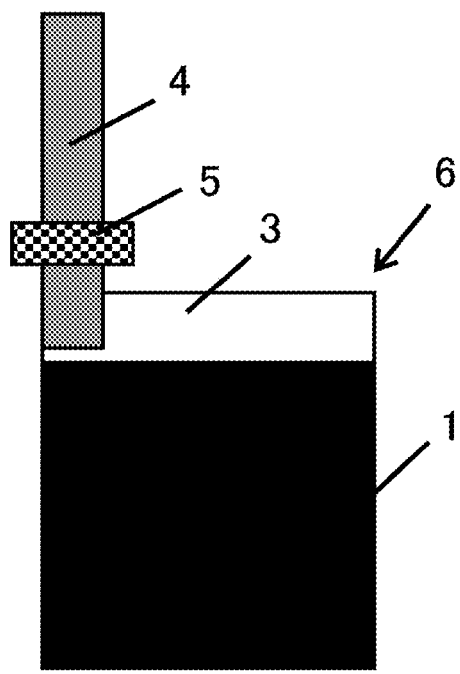
FIG. 3 is a drawing that illustrates a polarizable electrode formed by bonding the sheet-form electrode composition and the current collector and ultrasonically welding thereto an aluminum tab.

As illustrated in FIG. 2, a conductive adhesive 2 "HITASOL GA-703" manufactured by Hitachi Chemical Co., Ltd. was coated at a thickness of 100 μm on an etching aluminum foil 3 manufactured by Hohsen Corp. Further, as illustrated in FIG. 3, the etching aluminum foil 3 coated with the conductive adhesive 2 was adhered with the sheet-form electrode composition 1 which had been cut previously. Then, an aluminum tab 4 having a sealant 5, which was manufactured by Hohsen Corp., was welded to the etching aluminum foil 3 using an ultrasonic welding machine. Thereafter, the resultant was vacuum-dried at 120° C. to obtain a polarizable electrode 6 equipped with an aluminum current collector.

Figure 4:
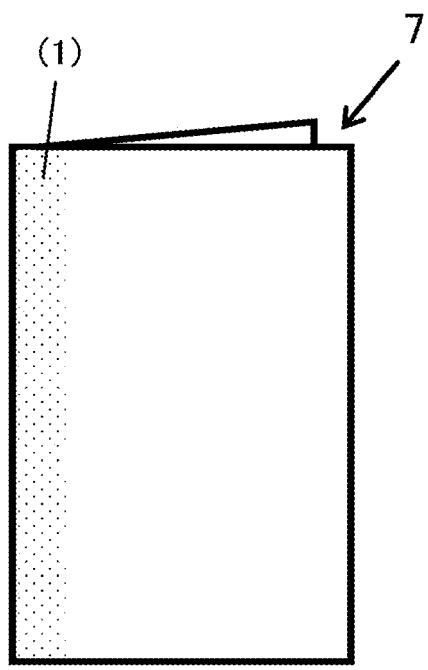
FIG. 4 is a drawing that illustrates a pouch-like outer package sheet.
Figure 5:
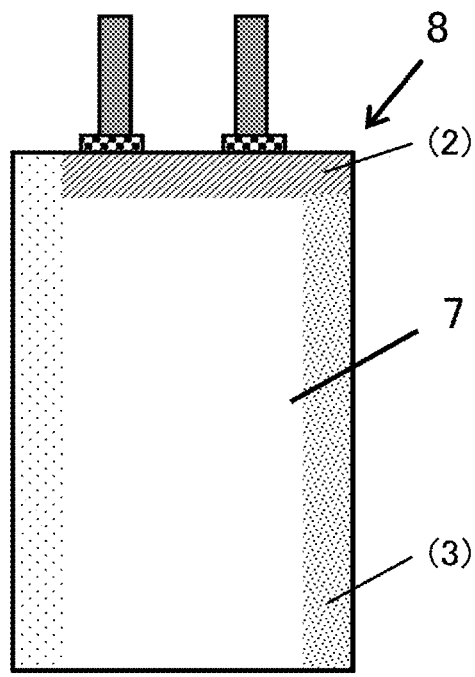
FIG. 5 is a drawing that illustrates an electric double-layer capacitor.

As illustrated in FIG. 4, an aluminum-laminated resin sheet manufactured by Hohsen Corp. was cut out in a rectangular shape (200 mm in length×60 mm in width) and folded in half, and the resultant was thermally press-bonded on one side ((1) in FIG. 4) to prepare a pouch-like outer package sheet 7 whose remaining two sides were open. Two pieces of the above-described polarizable electrodes 6 were superimposed with each other via a cellulose separator "TF-40" (not illustrated) manufactured by Nippon Kodoshi Corporation to prepare a laminate. This laminate was inserted into the outer package sheet 7, and the polarizable electrodes 6 were immobilized by thermally press-bonding one side ((2) in FIG. 5) with which the tab 4 was in contact. Then, the resultant was vacuum-dried at 120° C. under a reduced-pressure atmosphere for at least 16 hours, and an electrolyte solution was injected thereto in a dry box having an argon atmosphere (dew point: −90° C. or lower). As the electrolyte solution, an acetonitrile solution containing 1.0 mol/L of tetraethyl ammonium tetrafluoroborate manufactured by Kishida Chemical Co., Ltd. was used. After immersing the laminate into the electrolyte solution in the outer package sheet 7, the remaining one side ((3) in FIG. 5) of the outer package sheet 7 was thermally press-bonded to produce the electric double-layer capacitor 8 illustrated in FIG. 5.

[Measurement of Capacitance]

Using "CAPACITOR TESTER PFX2411" manufactured by Kikusui Electronics Corp., the thus obtained electric double-layer capacitor 8 was charged with a constant current of 50 mA per electrode surface area at 25° C. and −30° C. until the voltage reached 3.0 V. The electric double-layer capacitor 8 was further subjected to auxiliary charging under a constant voltage of 3.0 V for 30 minutes and, after the completion thereof, the electric double-layer capacitor 8 was discharged at 25 mA. From the thus obtained discharge curve data, the capacitance (F) was calculated using an energy conversion method. Specifically, after the charging, the discharging was performed until the voltage was reduced to zero, and the capacitance (F) was calculated from the energy that was discharged in this process. Then, the thus obtained value was divided by the electrode volume to determine the capacitance (F/cc).

[Durability Test]

As for a durability test, after the above-described measurement of capacitance, the capacitor 8 was retained in a 60° C. thermostat bath for 400 hours with a voltage of 3.0 V being applied thereto, and the capacitance was subsequently measured at 25° C. and −30° C. in the same manner as described above. From the capacitance measured before and after the durability test, the capacity retention rate was calculated for each temperature in accordance with the following formula. A time point after the initiation of the application of a voltage of 3.0 V in the 60° C. thermostat bath and subsequent 25-hour preconditioning operation was defined as "before durability test", and a time point after the 400-hour retention was defined as "after durability test".

Capacity retention rate(%) =

$$\frac{\text{Capacitance per volume of carbonaceous material after durability test}}{\text{Capacitance per volume of carbonaceous material before durability test}} \times 100$$

Example 1

A char produced from a coconut shell made in Philippines (specific surface area: 370 m²/g) was subjected to primary activation with a combination of a propane combustion gas and water vapor (water vapor partial pressure: 25%) at 850° C. until the below-described specific surface area was attained, whereby a primary-activated granular carbon having a specific surface area of 1,185 m²/g and an elemental potassium content of 7,949 ppm was obtained. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried to obtain a primary-washed granular activated carbon having an elemental potassium content of 150 ppm. This primary-washed granular activated carbon was further subjected to secondary activation with a propane combustion gas (water vapor partial pressure: 15%) at 950° C. until the below-described specific surface area was attained, whereby a secondary-activated granular carbon having a specific surface area of 1,715 m²/g and an average pore size of 1.97 nm was obtained. The thus obtained secondary-activated granular carbon was washed with an acid in the same manner as in the primary washing and subsequently dried, after which a heat treatment was performed thereon at 700° C. to obtain a secondary-washed granular activated carbon. This granular activated carbon was finely pulverized to an average particle size of 6 μm, whereby a carbonaceous material (1) having a specific surface area of 1,729 m²/g, an average pore size of 1.98 nm and an elemental potassium content of 8 ppm was obtained. Further, using the thus obtained carbonaceous material (1), an electrode composition (1) was obtained in accordance with the above-described electrode production method, and this electrode composition (1) was used to produce a polarizable electrode (1). Moreover, an electric double-layer capacitor (1) was produced using the polarizable electrode (1).

Example 2

A primary-activated granular carbon having a specific surface area of 1,206 m²/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 83 ppm. This granular activated carbon was further subjected to secondary activation with a propane combustion gas (water vapor partial pressure: 15%) at 930° C. until the below-described specific surface area was attained, whereby a secondary-activated granular carbon having a specific surface area of 1,682 m²/g and an average pore size of 1.85 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (2) having a specific surface area of 1,697 m²/g, an average pore size of 1.85 nm and an elemental potassium content of 9 ppm was obtained. Further, using the thus obtained carbonaceous material (2), an electrode composition (2), a polarizable electrode (2) and an electric double-layer capacitor (2) were produced in the same manner as in Example 1.

Example 3

A primary-activated granular carbon having a specific surface area of 1,163 m²/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 70 ppm. This granular activated carbon was further subjected to secondary activation with a propane combustion gas (water vapor partial pressure: 15%) at 950° C. until the below-described specific surface area was attained, whereby a secondary-activated granular carbon having a specific surface area of 1,530 m²/g and an average pore size of 1.84 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (3) having a specific surface area of 1,547 $m^2$/g, an average pore size of 1.85 nm and an elemental potassium content of 16 ppm was obtained. Further, using the thus obtained carbonaceous material (3), an electrode composition (3), a polarizable electrode (3) and an electric double-layer capacitor (3) were produced in the same manner as in Example 1.

Example 4

A primary-activated granular carbon having a specific surface area of 1,181 $m^2$/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 16 ppm. This granular activated carbon was further subjected to secondary activation with a propane combustion gas (water vapor partial pressure: 15%) at 970° C. until the below-described specific surface area was attained, whereby a secondary-activated granular carbon having a specific surface area of 1,565 $m^2$/g and an average pore size of 1.84 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (4) having a specific surface area of 1,588 $m^2$/g, an average pore size of 1.85 nm and an elemental potassium content of 5 ppm was obtained. Further, using the thus obtained carbonaceous material (4), an electrode composition (4), a polarizable electrode (4) and an electric double-layer capacitor (4) were produced in the same manner as in Example 1.

Example 5

A primary-activated granular carbon having a specific surface area of 1,360 $m^2$/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 22 ppm. This granular activated carbon was further subjected to secondary activation with a propane combustion gas (water vapor partial pressure: 15%) at 970° C. until the below-described specific surface area was attained, whereby a secondary-activated granular carbon having a specific surface area of 1,865 $m^2$/g and an average pore size of 1.93 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (5) having a specific surface area of 1,871 $m^2$/g, an average pore size of 1.93 nm and an elemental potassium content of 11 ppm was obtained. Further, using the thus obtained carbonaceous material (5), an electrode composition (5), a polarizable electrode (5) and an electric double-layer capacitor (5) were produced in the same manner as in Example 1.

Example 6

A primary-activated granular carbon having a specific surface area of 1,058 $m^2$/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 32 ppm. This granular activated carbon was further subjected to secondary activation with a propane combustion gas (water vapor partial pressure: 15%) at 950° C. until the below-described specific surface area was attained, whereby a secondary-activated granular carbon having a specific surface area of 1,530 $m^2$/g and an average pore size of 1.84 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (6) having a specific surface area of 1,538 $m^2$/g, an average pore size of 1.84 nm and an elemental potassium content of 13 ppm was obtained. Further, using the thus obtained carbonaceous material (6), an electrode composition (6), a polarizable electrode (6) and an electric double-layer capacitor (6) were produced in the same manner as in Example 1.

Comparative Example 1

A primary-activated granular carbon having a specific surface area of 1,165 $m^2$/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 25 ppm. This granular activated carbon was further subjected to secondary activation with a propane combustion gas (water vapor partial pressure: 15%) at 930° C. until the below-described specific surface area was attained, whereby a secondary-activated granular carbon having a specific surface area of 1,470 $m^2$/g and an average pore size of 1.81 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (7) having a specific surface area of 1,480 $m^2$/g and an average pore size of 1.81 nm was obtained. Further, using the thus obtained carbonaceous material (7), an electrode composition (7), a polarizable electrode (7) and an electric double-layer capacitor (7) were produced in the same manner as in Example 1.

Comparative Example 2

A primary-activated granular carbon having a specific surface area of 1,243 $m^2$/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 61 ppm. This granular activated carbon was further subjected to secondary activation with a propane combustion gas (water vapor partial pressure: 15%) at 970° C. until the below-described specific surface area was attained, whereby a secondary-activated granular carbon having a specific surface area of 2,180 m$^2$/g and an average pore size of 2.17 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (8) having a specific surface area of 2,184 m$^2$/g, an average pore size of 2.17 nm and an elemental potassium content of 8 ppm was obtained. Further, using the thus obtained carbonaceous material (8), an electrode composition (8), a polarizable electrode (8) and an electric double-layer capacitor (8) were produced in the same manner as in Example 1.

Comparative Example 3

A primary-activated granular carbon having a specific surface area of 1,350 m$^2$/g was obtained in the same manner as in Example 1. Subsequently, the thus obtained primary-activated granular carbon was washed with an acid in the same manner as in the primary washing of Example 1, and the resultant was dried to obtain a primary-washed granular activated carbon having an elemental potassium content of 23 ppm. This granular activated carbon was further subjected to secondary activation with a propane combustion gas (water vapor partial pressure: 15%) at 970° C. until the below-described specific surface area was attained, whereby a secondary-activated granular carbon having a specific surface area of 2,020 m$^2$/g and an average pore size of 2.04 nm was obtained. The thus obtained secondary-activated granular carbon was washed with an acid in the same manner as in the secondary washing of Example 1 and subsequently dried, after which a heat treatment was performed thereon at 700° C. to obtain a secondary-washed granular activated carbon. This granular activated carbon was finely pulverized to an average particle size of 6 μm, whereby a carbonaceous material (9) having a specific surface area of 2,027 m$^2$/g, an average pore size of 2.06 nm and an elemental potassium content of 18 ppm was obtained. Further, using the thus obtained carbonaceous material (9), an electrode composition (9), a polarizable electrode (9) and an electric double-layer capacitor (9) were produced in the same manner as in Example 1.

Comparative Example 4

A char produced from a coconut shell made in Philippines (specific surface area: 370 m$^2$/g) was subjected to primary activation with a combination of a propane combustion gas and water vapor (water vapor partial pressure: 25%) at 850° C. until the below-described specific surface area was attained, whereby a primary-activated granular carbon having a specific surface area of 1,135 m$^2$/g, an average pore size of 1.72 nm and an elemental potassium content of 7,636 ppm was obtained. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried and then heat-treated at 700° C. to obtain a primary-washed granular activated carbon. This granular activated carbon was finely pulverized to an average particle size of 6 μm, whereby a carbonaceous material (10) having a specific surface area of 1,143 m$^2$/g, an average pore size of 1.72 nm and an elemental potassium content of 29 ppm was obtained. Further, using the thus obtained carbonaceous material (10), an electrode composition (10), a polarizable electrode (10) and an electric double-layer capacitor (10) were produced in the same manner as in Example 1.

Comparative Example 5

A primary-activated granular carbon having a specific surface area of 1,428 m$^2$/g, an average pore size of 1.76 nm and an elemental potassium content of 9,821 ppm was obtained in the same manner as in Comparative Example 4. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried and then heat-treated at 700° C. to obtain a primary-washed granular activated carbon. This granular activated carbon was finely pulverized to an average particle size of 6 μm, whereby a carbonaceous material (11) having a specific surface area of 1,434 m$^2$/g, an average pore size of 1.76 nm and an elemental potassium content of 15 ppm was obtained. Further, using the thus obtained carbonaceous material (11), an electrode composition (11), a polarizable electrode (11) and an electric double-layer capacitor (11) were produced in the same manner as in Example 1.

Comparative Example 6

A primary-activated granular carbon having a specific surface area of 1,663 m$^2$/g, an average pore size of 1.80 nm and an elemental potassium content of 11,590 ppm was obtained in the same manner as in Comparative Example 4. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried and then heat-treated at 700° C. to obtain a primary-washed granular activated carbon. This granular activated carbon was finely pulverized to an average particle size of 6 μm, whereby a carbonaceous material (12) having a specific surface area of 1,685 m$^2$/g, an average pore size of 1.80 nm and an elemental potassium content of 25 ppm was obtained. Various physical properties of the thus obtained carbonaceous material (12) were measured. Further, using the carbonaceous material (12), an electrode composition (12), a polarizable electrode (12) and an electric double-layer capacitor (12) were produced in the same manner as in Example 1.

Comparative Example 7

A primary-activated granular carbon having a specific surface area of 1,901 m$^2$/g, an average pore size of 1.83 nm and an elemental potassium content of 13,289 ppm was obtained in the same manner as in Comparative Example 4. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried and then heat-treated at 700° C. to obtain a primary-washed granular activated carbon. This granular activated carbon was finely pulverized to an average particle size of 6 μm, whereby a carbonaceous material (13) having a specific surface area of 1,921 m²/g, an average pore size of 1.83 nm and an elemental potassium content of 12 ppm was obtained. Further, using the thus obtained carbonaceous material (13), an electrode composition (13), a polarizable electrode (13) and an electric double-layer capacitor (13) were produced in the same manner as in Example 1.

Comparative Example 8

A primary-activated granular carbon having a specific surface area of 2,098 m²/g, an average pore size of 1.96 nm and an elemental potassium content of 14,107 ppm was obtained in the same manner as in Comparative Example 4. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried and then heat-treated at 700° C. to obtain a primary-washed granular activated carbon. This granular activated carbon was finely pulverized to an average particle size of 6 μm, whereby a carbonaceous material (14) having a specific surface area of 2,107 m²/g, an average pore size of 1.96 nm and an elemental potassium content of 6 ppm was obtained. Further, using the thus obtained carbonaceous material (14), an electrode composition (14), a polarizable electrode (14) and an electric double-layer capacitor (14) were produced in the same manner as in Example 1.

Comparative Example 9

A primary-activated granular carbon having a specific surface area of 2,200 m²/g, an average pore size of 2.07 nm and an elemental potassium content of 15,664 ppm was obtained in the same manner as in Comparative Example 4. Subsequently, the thus obtained primary-activated granular carbon was washed with hydrochloric acid (concentration: 0.5 N, diluent: ion exchanged water) at a temperature of 85° C. for 30 minutes and then thoroughly washed with ion exchanged water for removal of residual acid, after which the resultant was dried and then heat-treated at 700° C. to obtain a primary-washed granular activated carbon. This granular activated carbon was finely pulverized to an average particle size of 6 μm, whereby a carbonaceous material (15) having a specific surface area of 2,220 m²/g, an average pore size of 2.07 nm and an elemental potassium content of 13 ppm was obtained. Further, using the thus obtained carbonaceous material (15), an electrode composition (15), a polarizable electrode (15) and an electric double-layer capacitor (15) were produced in the same manner as in Example 1.

Various physical properties of the carbonaceous materials (1) to (15) obtained in the above-described manner were measured in accordance with the above-described methods. In addition, the ratios A to C were calculated. The results thereof are shown in Tables 1 and 2. Further, various measurements were also performed for the electric double-layer capacitors (1) to (15) obtained in the above-described manner. The results thereof are shown in Table 3.

TABLE 1

|  |  | Carbonaceous material | BET specific surface area [m²/g] | Average pore size [nm] | Total pore volume [cm³/g] | Powder packing density [g/cm³] |
|---|---|---|---|---|---|---|
| Example | 1 | (1) | 1,729 | 1.98 | 0.858 | 0.6456 |
|  | 2 | (2) | 1,697 | 1.85 | 0.785 | 0.6743 |
|  | 3 | (3) | 1,547 | 1.85 | 0.715 | 0.7214 |
|  | 4 | (4) | 1,588 | 1.85 | 0.736 | 0.7031 |
|  | 5 | (5) | 1,871 | 1.93 | 0.905 | 0.6251 |
|  | 6 | (6) | 1,538 | 1.84 | 0.707 | 0.7171 |
| Comparative Example | 1 | (7) | 1,480 | 1.81 | 0.671 | 0.7268 |
|  | 2 | (8) | 2,184 | 2.17 | 1.183 | 0.5578 |
|  | 3 | (9) | 2,027 | 2.06 | 1.044 | 0.5915 |
|  | 4 | (10) | 1,143 | 1.72 | 0.492 | 0.8471 |
|  | 5 | (11) | 1,434 | 1.76 | 0.632 | 0.7551 |
|  | 6 | (12) | 1,685 | 1.80 | 0.759 | 0.7061 |
|  | 7 | (13) | 1,921 | 1.83 | 0.880 | 0.6619 |
|  | 8 | (14) | 2,107 | 1.96 | 1.030 | 0.5991 |
|  | 9 | (15) | 2,220 | 2.07 | 1.148 | 0.5764 |

TABLE 2

|  |  | Carbonaceous material | Pore volume determined by MP method [cm³/g] | | | Pore volume determined by BJH method [cm³/g] | | | Ratio [%] | | |
|---|---|---|---|---|---|---|---|---|---|---|---|
|  |  |  | 2 nm or smaller | 1 nm or smaller | 1 to 2 nm | 2 nm or larger | 3 nm or larger | 3 nm or smaller | A | B | C |
| Example | 1 | (1) | 0.742 | 0.634 | 0.109 | 0.234 | 0.179 | 0.679 | 79.1 | 12.6 | 14.6 |
|  | 2 | (2) | 0.748 | 0.643 | 0.104 | 0.157 | 0.116 | 0.669 | 85.2 | 13.3 | 13.9 |
|  | 3 | (3) | 0.682 | 0.593 | 0.089 | 0.136 | 0.101 | 0.614 | 85.8 | 12.4 | 13.1 |
|  | 4 | (4) | 0.668 | 0.579 | 0.088 | 0.139 | 0.108 | 0.629 | 85.4 | 12.0 | 13.2 |
|  | 5 | (5) | 0.785 | 0.632 | 0.153 | 0.214 | 0.165 | 0.740 | 81.7 | 16.9 | 19.5 |
|  | 6 | (6) | 0.660 | 0.584 | 0.076 | 0.131 | 0.099 | 0.609 | 86.0 | 10.7 | 11.5 |
| Comparative Example | 1 | (7) | 0.630 | 0.579 | 0.051 | 0.114 | 0.087 | 0.583 | 87.0 | 7.6 | 8.0 |
|  | 2 | (8) | 0.895 | 0.587 | 0.308 | 0.409 | 0.295 | 0.888 | 75.0 | 26.2 | 34.4 |
|  | 3 | (9) | 0.840 | 0.609 | 0.230 | 0.312 | 0.230 | 0.814 | 77.9 | 21.6 | 27.4 |
|  | 4 | (10) | 0.482 | 0.452 | 0.030 | 0.060 | 0.046 | 0.447 | 90.7 | 6.1 | 6.2 |
|  | 5 | (11) | 0.615 | 0.570 | 0.045 | 0.087 | 0.065 | 0.567 | 89.8 | 7.2 | 7.3 |

TABLE 2-continued

| Carbon- | Pore volume determined by MP method [cm³/g] | | | Pore volume determined by BJH method [cm³/g] | | | Ratio [%] | | |
|---|---|---|---|---|---|---|---|---|---|
| aceous material | 2 nm or smaller | 1 nm or smaller | 1 to 2 nm | 2 nm or larger | 3 nm or larger | 3 nm or smaller | A | B | C |
| 6 (12) | 0.721 | 0.662 | 0.059 | 0.124 | 0.091 | 0.668 | 88.0 | 7.8 | 8.2 |
| 7 (13) | 0.856 | 0.752 | 0.105 | 0.164 | 0.107 | 0.773 | 87.9 | 11.9 | 12.2 |
| 8 (14) | 0.994 | 0.805 | 0.189 | 0.270 | 0.167 | 0.863 | 83.8 | 18.4 | 19.0 |
| 9 (15) | 1.098 | 0.842 | 0.256 | 0.361 | 0.204 | 0.943 | 82.2 | 22.3 | 23.3 |

TABLE 3

| | | Electric capacitor double-layer | Capacitance per volume at 25° C. (F/cc) | | Capacitance per volume at −30° C. (F/cc) | | Capacity retention rate at 25° C. (%) | Capacity retention rate at −30° C. (%) |
|---|---|---|---|---|---|---|---|---|
| | | | 0 h before durability test | 400 h after durability test | 0 h before durability test | 400 h after durability test | 400 h after durability test | 400 h after durability test |
| Example | 1 | (1) | 14.3 | 12.0 | 14.2 | 11.6 | 84 | 81 |
| | 2 | (2) | 14.7 | 12.2 | 14.7 | 11.4 | 83 | 78 |
| | 3 | (3) | 15.1 | 12.9 | 15.0 | 12.0 | 85 | 80 |
| | 4 | (4) | 14.7 | 12.5 | 14.8 | 11.0 | 85 | 74 |
| | 5 | (5) | 13.9 | 11.3 | 14.0 | 11.5 | 81 | 79 |
| | 6 | (6) | 14.9 | 12.2 | 14.9 | 10.9 | 82 | 73 |
| Comparative Example | 1 | (7) | 14.9 | 11.3 | 14.9 | 9.5 | 76 | 64 |
| | 2 | (8) | 12.4 | 10.3 | 12.5 | 9.6 | 83 | 77 |
| | 3 | (9) | 12.5 | 10.2 | 12.6 | 9.9 | 78 | 79 |
| | 4 | (10) | 16.3 | 11.3 | 14.9 | 6.1 | 70 | 41 |
| | 5 | (11) | 15.6 | 11.4 | 15.7 | 7.8 | 73 | 50 |
| | 6 | (12) | 15.4 | 11.7 | 15.4 | 9.7 | 76 | 63 |
| | 7 | (13) | 14.4 | 11.2 | 14.4 | 9.9 | 78 | 68 |
| | 8 | (14) | 13.4 | 10.7 | 13.4 | 9.5 | 80 | 71 |
| | 9 | (15) | 12.7 | 10.3 | 12.7 | 9.2 | 81 | 73 |

<Initial Performance of Electric Double-Layer Capacitors, and Performance Evaluation after Durability Test>

In cases where a durability test is conducted as performance evaluation of an electric double-layer capacitor, the capacity and the resistance at normal temperature (25° C.) are generally evaluated before and after an accelerated test, and the changes in these properties are measured. However, such evaluation at normal temperature requires a long-term test for confirmation of deterioration phenomena. Accordingly, by evaluating the capacity and the resistance at a low temperature, the deterioration phenomena can be compared and confirmed promptly as compared to a case of performing the evaluation at a normal temperature.

Particularly, in cases where the measurement and comparison are performed at a low temperature, it is believed that the low temperature causes an increase in the viscosity of the electrolyte solution and, for example, deterioration of the electrode materials and the electrode interface and/or deterioration of the electrolyte solution are more notably reflected in the evaluations of the capacity, resistance and the like. From this standpoint, in the present invention, in order to clearly compare and examine the deterioration phenomena, a durability test (at 60° C. with a load of 3V for a prescribed time) was conducted and the deterioration state thereafter was compared mainly based on the evaluation at −30° C.

As shown in Table 3, the electric double-layer capacitors (1) to (6) that were produced in Examples 1 to 6 using the respective polarizable electrodes (1) to (6) containing the carbonaceous material of the present invention had a higher capacitance per volume after the durability test and exhibited a more favorable value of capacity retention rate at both 25° C. and −30° C., as compared to the electric double-layer capacitors (7) to (15) that were produced in Comparative Examples 1 to 9 using the carbonaceous materials (7) to (15).

The results that were obtained in Examples and Comparative Examples will now be described referring to the figures.

Figure 6:
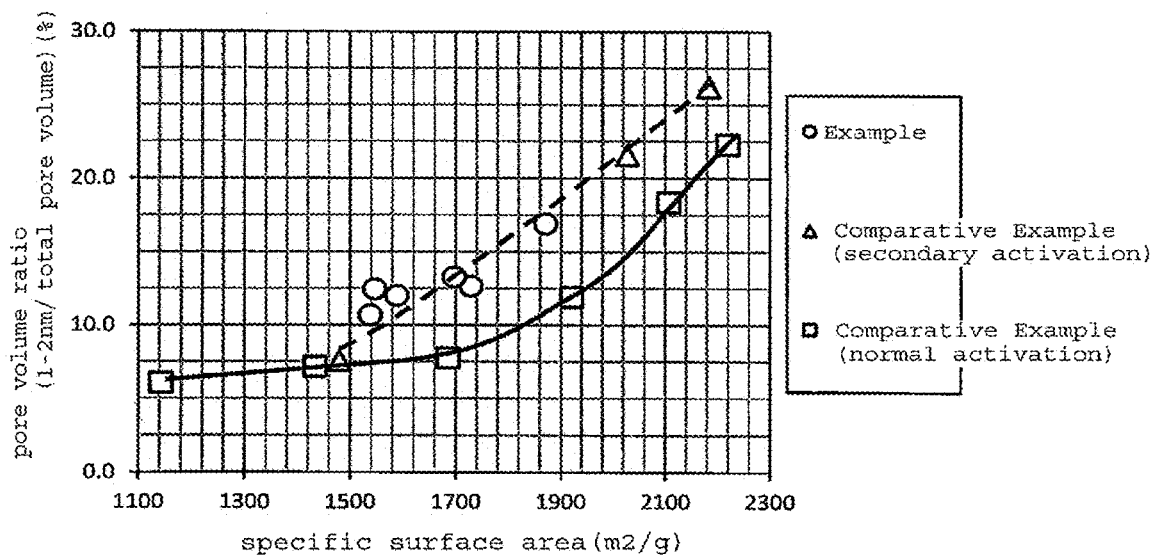
FIG. 6 is a graph showing the relationships between the specific surface area of carbonaceous materials and the pore volume ratio of micropores having a pore width of 1 to 2 nm with respect to a total pore volume.

FIG. 6 shows the relationships between the specific surface area of the respective carbonaceous materials and the pore volume ratio of micropores having a pore size of 1 to 2 nm with respect to a total pore volume. In the case of a gas-activated carbon, the specific surface area and the pore size are increased with the progress of activation; however, as shown in FIG. 6, it is seen that, in Examples 1 to 6 where secondary activation and secondary washing were performed after primary washing, the ratio of the volume of 1 to 2-nm pores with respect to the total pore volume was increased in a range of relatively low specific surface area as compared to Comparative Examples 4 to 9 where the production was performed by a general method (normal activation) that included only primary activation.

Figure 7:
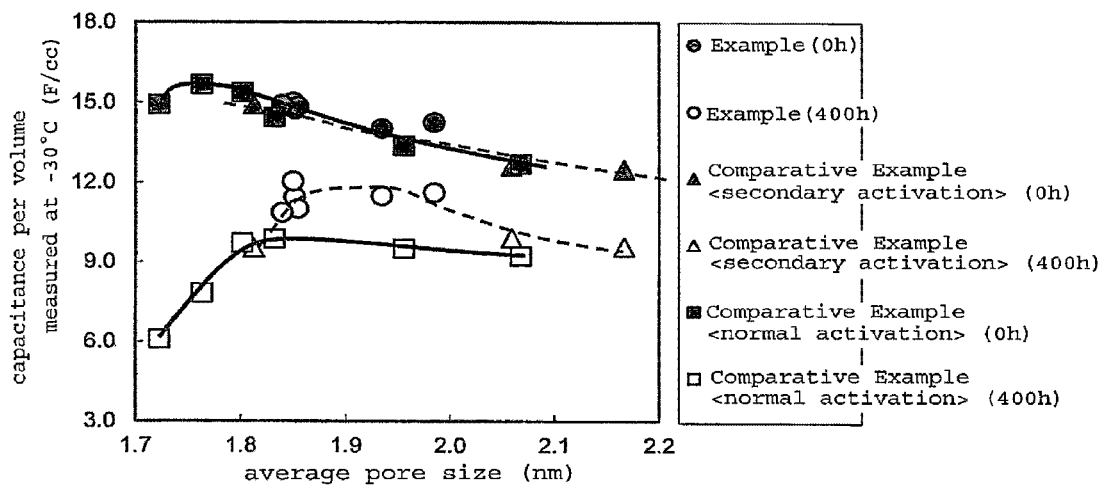
FIG. 7 is a graph showing the relationships between the average pore size of carbonaceous materials and the capacitance per volume of the carbonaceous materials measured at −30° C. before a durability test.

FIG. 7 shows the relationships between the average pore size of the respective carbonaceous materials and the capacitance per volume of the carbonaceous materials measured at −30° C. before and after the durability test. Further, FIG. 8 shows the relationships between the average pore size of the respective carbonaceous materials and the capacity retention rate measured at −30° C. after the durability test.

Figure 8:
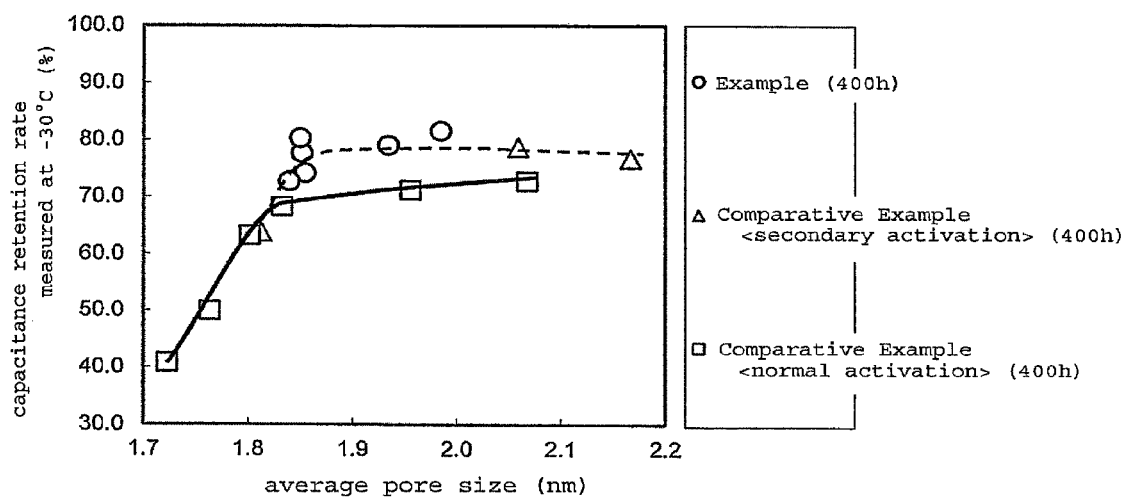
FIG. 8 is a graph showing the relationships between the average pore size of carbonaceous materials and the capacity retention rate measured at −30° C. after a durability test.

As shown in FIGS. 7 and 8, in Examples 1 to 6 where the average pore size was within a range of 1.84 to 2.05 nm, it is seen that, although the initial capacitance per volume (capacitance before the durability test) was substantially the same, the capacitance retention rate after the durability test was high, and a high capacitance per volume was attained even after the durability test. On the other hand, when the average pore size was smaller than 1.85 nm as in the case of Comparative Example 1, although the initial capacitance was high, the capacitance after the durability test was low and the capacity retention rate was reduced. Further, it is seen that, when the average pore size was larger than 2.05 nm as in the cases of Comparative Examples 2 and 3, although the capacity retention rate was high, the capacitance per volume after the durability test was low due to a low initial capacitance.

Figure 9:
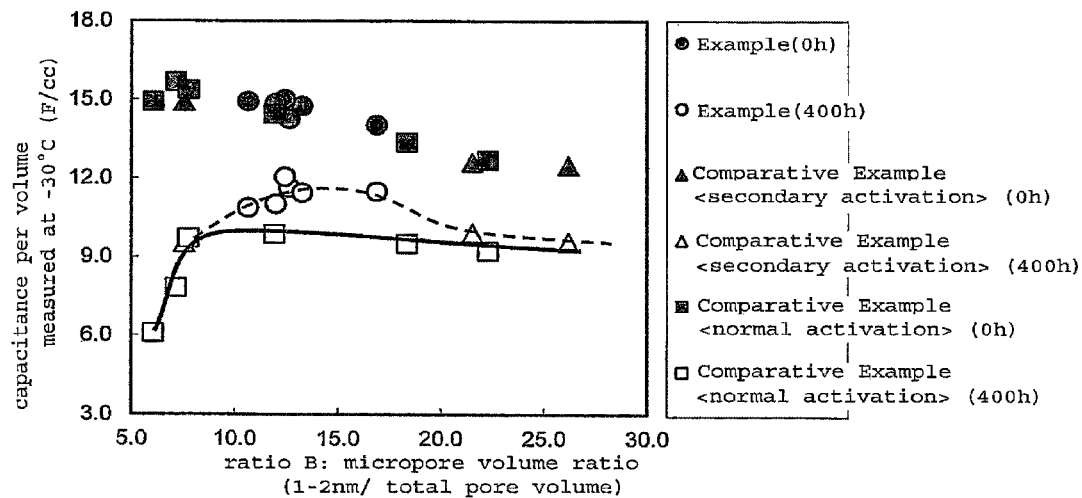
FIG. 9 is a graph showing the relationships between the ratio (ratio B) of the volume of micropores having a pore size of 1 to 2 nm with respect to a total pore volume in carbonaceous materials and the capacitance per volume of the respective carbonaceous materials measured at −30° C. before and after a durability test.

FIG. 9 shows the relationships between the ratio (ratio B) of the volume of micropores having a pore size of 1 to 2 nm, which volume is determined by the MP method, with respect to a total pore volume in the respective carbonaceous materials, and the capacitance per volume of the carbonaceous materials measured at −30° C. before and after the durability test. Further, FIG. 10 shows the relationships between the ratio (ratio B) of the volume of micropores having a pore size of 1 to 2 nm, which volume is determined by the MP method, with respect to a total pore volume in the respective carbonaceous materials and the capacitance retention rate of the carbonaceous materials measured at −30° C. after the durability test.

Figure 10:
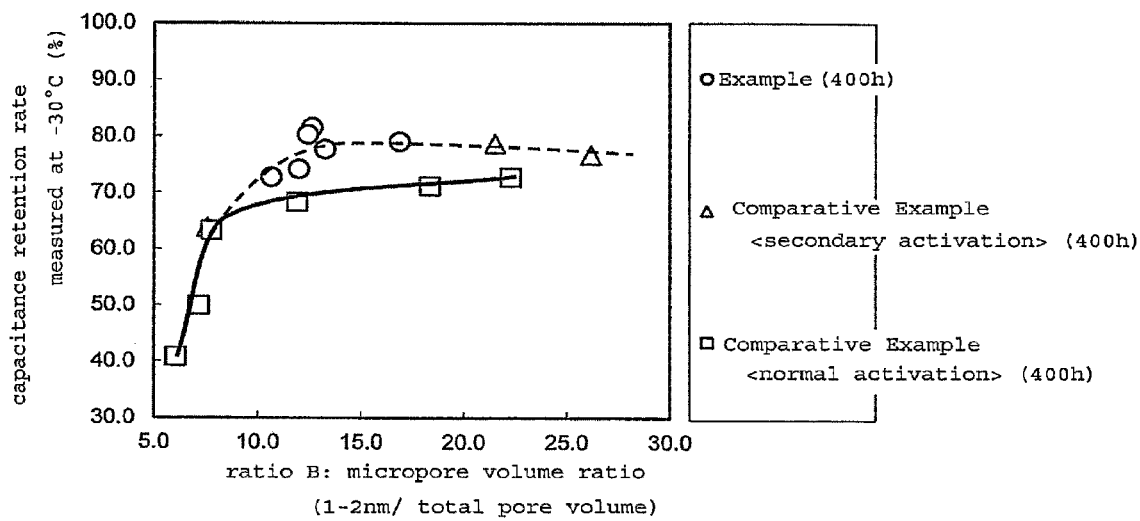
FIG. 10 is a graph showing the relationships between the ratio (ratio B) of the volume of micropores having a pore size of 1 to 2 nm with respect to a total pore volume in carbonaceous materials and the capacity retention rate of the respective carbonaceous materials measured at −30° C. after a durability test.

As shown in FIGS. 9 and 10, in Examples 1 to 6 where the ratio B was within a range of 10 to 20%, it is seen that not only the initial capacitance (capacitance before the durability test) was high, but also the capacity retention rate was high because of a limited reduction in the capacitance during the durability test. On the other hand, when the ratio A was lower than 10% as in the case of Comparative Example 1, the capacity was markedly reduced after the durability test, and the capacity retention rate was thus poor. Further, it is seen that, when the ratio A was higher than 20% as in the cases of Comparative Examples 2 and 3, the initial capacitance was low although the capacity retention rate was high.

As described above, it was demonstrated that an electric double-layer capacitor according to one preferred embodiment of the electrochemical device of the present invention is capable of maintaining a sufficient capacitance not only after a durability test but also in low-temperature ranges because of the inhibition of a reduction in the initial capacity caused by an increase in the pore size; therefore, the electric double-layer capacitor is capable of exerting sufficient performance even in a situation where deterioration is accelerated, such as a cold region.

From the above, it is apparent that an electrochemical device having a high capacitance per volume and excellent durability can be obtained by using the carbonaceous material of the present invention as an electrode active material for the electrochemical device in an electrode.

DESCRIPTION OF SYMBOLS

1: electrode composition
2: conductive adhesive
3: etching aluminum foil
4: tab
5: sealant
6: polarizable electrode
7: outer package sheet
8: electric double-layer capacitor

The invention claimed is:

1. A carbonaceous material, having
   a BET specific surface area in a range of from 1,500 to 1,900 m$^2$/g,
   an average pore size in a range of from 1.84 to 2.05 nm at a nitrogen relative pressure $P/P_0$ of 0.93 in a nitrogen adsorption isotherm measured at a temperature of 77.4 K,
   a ratio of a volume of pores having a pore size of 3 nm or smaller, determined by the BJH method, in a range of from 65 to 90% with respect to a total pore volume calculated based on a nitrogen adsorption amount at a relative pressure $P/P_0$ of 0.93 in the nitrogen adsorption isotherm, and
   a ratio of a volume of pores having a pore size in a range of from 1 to 2 nm, which volume is determined by the MP method, in a range of from 10 to 20% with respect to the total pore volume calculated based on the nitrogen adsorption amount at a relative pressure $P/P_0$ of 0.93 in the nitrogen adsorption isotherm.

2. The carbonaceous material of claim 1, wherein a ratio of the volume of pores having a pore size in a range of from 1 to 2 nm, which volume is determined by the MP method, is in a range of from 10 to 22% with respect to a total micropore volume determined by the MP method.

3. The carbonaceous material of claim 1, wherein the total pore volume calculated based on the nitrogen adsorption amount at a relative pressure $P/P_0$ of 0.93 in the nitrogen adsorption isotherm is in a range of from 0.7 to 1.0 cm$^3$/g.

4. The carbonaceous material of claim 1, having a powder packing density in a range of from 0.60 to 0.73 g/cm$^3$ when compressed with a pressure of 12 kN.

5. The carbonaceous material of claim 1, which is based on a plant-derived carbon precursor.

6. The carbonaceous material of claim 1, which is derived from a coconut shell.

7. The carbonaceous material of claim 1, wherein the average pore size is less than 2.05 nm at a nitrogen relative pressure P/P0 of 0.93 in a nitrogen adsorption isotherm measured at a temperature of 77.4 K.

8. An electrode active material for electrochemical devices, comprising:
   the carbonaceous material of claim 1.

9. An electrode suitable for an electrochemical device, comprising:
   the electrode active material of claim 8.

10. An electrochemical device, comprising:
    the electrode of claim 9.

11. A method of producing the carbonaceous material of claim 1, comprising:
    performing carbonization, primary activation with an activation gas comprising water vapor, washing, and secondary activation with an activation gas comprising water vapor on a carbon precursor to obtain the carbonaceous material.

* * * * *